(12) United States Patent
Wada et al.

(10) Patent No.: US 7,558,800 B2
(45) Date of Patent: Jul. 7, 2009

(54) INFORMATION PROVIDING APPARATUS, TERMINAL APPARATUS, INFORMATION PROVIDING SYSTEM AND INFORMATION PROVIDING METHOD

(75) Inventors: Toshiaki Wada, Tama (JP); Naoki Morita, Hachioji (JP)

(73) Assignee: Olympus Corporation, Tokyo (JP)

( * ) Notice: Subject to any disclaimer, the term of this patent is extended or adjusted under 35 U.S.C. 154(b) by 393 days.

(21) Appl. No.: 11/216,821

(22) Filed: Aug. 31, 2005

(65) Prior Publication Data

US 2006/0059519 A1    Mar. 16, 2006

(30) Foreign Application Priority Data

Sep. 2, 2004    (JP)    ............................. 2004-255712
Aug. 9, 2005    (JP)    ............................. 2005-230937

(51) Int. Cl.
   *G06F 7/00*    (2006.01)
   *G06F 17/00*    (2006.01)

(52) U.S. Cl. ............................... 707/100; 707/1; 707/3; 707/5; 707/102

(58) Field of Classification Search ...................... 707/1, 707/3, 5, 100, 102

See application file for complete search history.

(56) References Cited

U.S. PATENT DOCUMENTS

| | | | | |
|---|---|---|---|---|
| 5,794,249 | A * | 8/1998 | Orsolini et al. | ........... 707/104.1 |
| 6,895,406 | B2 * | 5/2005 | Fables et al. | ................ 707/102 |
| 7,065,519 | B2 * | 6/2006 | Yamaguchi | .................... 707/3 |
| 7,085,761 | B2 * | 8/2006 | Shibata | ........................... 707/5 |
| 7,123,696 | B2 * | 10/2006 | Lowe | ....................... 379/88.16 |
| 7,266,546 | B2 * | 9/2007 | Son | ............................... 707/3 |
| 2002/0073058 | A1 * | 6/2002 | Kremer et al. | ................ 707/1 |
| 2002/0087577 | A1 * | 7/2002 | Manjunath et al. | ........ 707/104.1 |
| 2005/0033657 | A1 * | 2/2005 | Herrington et al. | ............ 705/26 |
| 2005/0165739 | A1 * | 7/2005 | Yamamoto et al. | ............. 707/3 |
| 2005/0188057 | A1 * | 8/2005 | Joo | ............................. 709/219 |
| 2005/0240575 | A1 * | 10/2005 | Iida | ................................ 707/3 |

FOREIGN PATENT DOCUMENTS

JP    2003-16085    1/2003

* cited by examiner

*Primary Examiner*—Tim T. Vo
*Assistant Examiner*—Jay A Morrison
(74) *Attorney, Agent, or Firm*—Straub & Pokotylo; John C. Pokotylo

(57) ABSTRACT

An information providing apparatus includes, a communication section configured to transmit and receive to and from the terminal apparatus, a command analysis section configured to specify a command from the terminal apparatus, a user specifying section configured to specify a user transmitting the command, a keyword system providing section configured to transmit all or part of the keyword system to the terminal apparatus when a specified command is a keyword list request command, a content preview select section configured to specify at least one content based on the keyword, the user personal information and the history information when a specified command is a content preview request command, and select the preview data and content specifying data, and a content preview providing section configured to transmit the content preview data and the content specifying data to the terminal apparatus.

4 Claims, 15 Drawing Sheets

FIG. 1A

| Category |
|---|
| Entrance ceremony |
| Field day |
| Graduation (commencement) |
| ... |

FIG. 1B

| Category | Keyword |
|---|---|
| Entrance ceremony | Pikka Pika |
|  | Fortunately, you pass the examination |
|  | Wonderful, son ! |
|  | etc... |
| Field day | My heart raced in a moment of start |
|  | I've done it ! Win first place |
|  | Get may revenge nest |
|  | etc... |
| Graduation (commencement) | Thanks, teacher |
|  | Be friend, forever |
|  | Tears at parting |
|  | etc... |
| etc... | etc... |

FIG. 1C

| Keyword | Sound group |
|---|---|
| I've done it ! Win first place | Sample sound 1 (e.g., music like a fanfare) |
|  | Sample sound 2 (e.g., yell like "I've done it !") |
|  | Sample sound 2 (e.g., sound effect like a clap) |
|  | etc... |

| User ID | Password | Birthday | Age | Gender (Sex) | Blood type | Occupation | ... |

| User ID | Sound ID | Keyword | Access data | ... |

INFORMATION PROVIDING APPARATUS, TERMINAL APPARATUS, INFORMATION PROVIDING SYSTEM AND INFORMATION PROVIDING METHOD

CROSS-REFERENCE TO RELATED APPLICATIONS

This application is based upon and claims the benefit of priority from prior Japanese Patent Applications No. 2004-255712, filed Sep. 2, 2004; and No. 2005-230937, filed Aug. 9, 2005, the entire contents of both of which are incorporated herein by reference.

BACKGROUND OF THE INVENTION

1. Field of the Invention

The present invention relates to an information providing apparatus for providing information via a network, and to a terminal apparatus for acquiring information via a network. Moreover, the present invention relates to an information providing system comprising apparatuses described above, and terminal apparatus, and to an information providing method.

2. Description of the Related Art

Conventionally, it is general that the following method is employed to acquire contents such as sound, photo, image and video from a server via network. According to the method, a terminal apparatus acquires a provide-able content list, and thereafter, searches a desired content from the content list. If the desired content is found, the terminal apparatus specifies the content to acquire the target content.

However, the foregoing method has the following problem. If a great many of provide-able contents is given, much time and labor are taken to search the target content from the content list. For this reason, the following method of searching the target content is proposed. According to the method, keyword such as work name, producer name, produced date is given to the content. The given keyword is specified to search a desired content.

Moreover, the content searching system is proposed (see JPN. PAT. APPLN. KOKAI Publication No. 2003-16085). The system provides keywords classified based on category hierarchy to a user terminal. Keyword setting is simplified using the classification to search a desired content.

On the other hand, user must make management of contents acquired via the network and contents produced by self. If the number of contents increases, much time and labor are taken to search a desired content as described above. In also case, the method of giving keywords to the desired content is proposed.

BRIEF SUMMARY OF THE INVENTION

According to a first aspect of the present invention, there is provided an information providing apparatus for providing information including any one of at least sound, still image and video information to terminal apparatuses connected via a network, comprising: a communication section configured to transmit and receive to and from the terminal apparatus via the network; a content database configured to store several contents of the information and preview data of each content; a keyword database configured to store a keyword system composed of at least one keyword given to each content; a command analysis section configured to specify a command from the terminal apparatus received by the communication section; a user specifying section configured to specify a user transmitting the command; a management database configured to store user personal information of the terminal apparatus and information providing history information to the user; a keyword system providing section configured to transmit all or part of the keyword system stored in the keyword database to the terminal apparatus via the communication section when a command specified by the command analysis section is a keyword list request command; a content preview select section configured to specify at least one content from several contents stored in the content database based on the keyword, the user personal information and the information providing history information stored in the management database when a command specified by the command analysis section is a content preview request command including the keyword, and select the preview data of the specified content and content specifying data for specifying the content; and a content preview providing section configured to transmit the content preview data and the content specifying data selected by the content preview select section to the terminal apparatus via the communication section.

According to a second aspect of the present invention, there is provided an information providing apparatus for providing information including any one of at least sound, still image and video information to terminal apparatuses connected via a network, comprising: a communication section configured to transmit and receive to and from the terminal apparatus via the network; a content database configured to store several contents of the information and preview data of each content; a keyword database configured to store a keyword system composed of several keywords; a command analysis section configured to specify a command from the terminal apparatus received by the communication section; a user specifying section configured to specify a user transmitting the command; a management database configured to store user personal information of the terminal apparatus and information providing history information to the user; a content providing section configured to transmit a content specified by the content specifying data stored in the content database to the terminal apparatus via the communication section when a command specified by the command analysis section is a content request command including a content specifying data specifying at least one content; a keyword select section configured to select at least one keyword stored in the keyword database based on the content specifying data, the user personal information and the information providing history information stored in the management database when a command specified by the command analysis section is a keyword request command including one content specifying data; and a keyword providing section configured to transmit the keyword selected by the keyword select section to the terminal apparatus via the communication section.

According to a third aspect of the present invention, there is provided a terminal apparatus for acquiring information including any one of at least sound, still image and video information from an information providing apparatus connected via a network, comprising: a communication section transmitting and receiving to and from the information providing apparatus via the network; an image storage section configured to store at least one image; an image select section configured to select an image stored in the image storage section; a keyword list request section configured to transmit a keyword list request command to the information providing apparatus via the communication section; a select section configured to select a keyword from a keyword list received via the communication section; a content preview request section configured to transmit a content preview request command including the selected keyword to the information providing apparatus; a content select section configured to select a content from several content preview data received via the communication section; a content request section configured to transmit a content request command including a content specifying information for specifying the selected content; an associating section configured to associate the content received via the communication section with the image; and a content reproducing section configured to reproduce the content associated by the associating section when the image selected by the image select section is displayed on an image display section.

According to a fourth aspect of the present invention, there is provided a terminal apparatus for acquiring information including any one of at least sound, still image and video information from an information providing apparatus connected via a network, comprising: a communication section configured to transmit and receive to and from the information providing apparatus via the network; a content request section configured to transmit a content request command including content specifying information for specifying a content to the information providing apparatus via the communication section; a content storage section configured to store a content received from the information providing apparatus via the communication section; a content select section configured to select a content stored in the content storage section; a keyword request section configured to transmit a keyword request command including a second content specifying information for specifying the content selected by the content select section to the information providing apparatus via the communication section; a keyword receiving section configured to receive at least one keyword from the information providing apparatus via the communication section; a keyword giving section configured to select one keyword from keywords received by the keyword receiving section, and give the keyword to the content selected by the content select section; and a keyword information providing section configured to transmit a keyword information registration command including the keyword given by the keyword giving section and the second content specifying information to the information providing apparatus via the communication section.

According to a fifth aspect of the present invention, there is provided an information providing system having terminal apparatuses connected to a network, and an information providing apparatus connected to the network, and providing information including any one of at least sound, still image and video information to the terminal apparatus.

According to a sixth aspect of the present invention, there is provided an information providing system having terminal apparatuses connected to a network, and an information providing apparatus connected to the network, and providing information including any one of at least sound, still image and video information to each terminal apparatus.

According to a seventh aspect of the present invention, there is provided an information providing method used for an information providing system having terminal apparatuses connected to a network, and an information providing apparatus connected to the network and providing information including any one of at least sound, still image and video information to the terminal apparatus, comprising: storing several contents of the information and preview data of each content in a content database in the information providing apparatus; storing a keyword system composed of at least one keyword given to each content in a keyword database; in the information providing apparatus; transmitting user personal information of the terminal apparatus to the information providing apparatus in the terminal apparatus; storing the user personal information of the terminal apparatus and information providing history information to the user in the information providing apparatus; selecting an image stored in the image storage section in the terminal apparatus; transmitting a keyword list request command to the information providing apparatus in the terminal apparatus; receiving the keyword list request command from the terminal apparatus in the information providing apparatus; transmitting all or part of the keyword system stored in the keyword database to the terminal apparatus as a keyword list in the information providing apparatus; selecting a keyword from the received keyword list, and transmitting a content preview request command including the selected keyword to the information providing apparatus in the terminal apparatus; receiving the content preview request command including the selected keyword in the information providing apparatus; specifying at least one content from several contents stored in the content database based on the keyword, the user personal information and the information providing history information stored in the management database, and selecting the preview data of the specified content and content specifying data for specifying the content in the information providing apparatus; transmitting the content preview data and the content specifying data to the terminal apparatus in the information providing apparatus; selecting a content from the received content preview data, and transmitting a content request command including content specifying information for specifying the selected content in the terminal apparatus; receiving the content request command including the content specifying data in the information providing apparatus; transmitting a content specified by the content specifying data stored in the content database to the terminal apparatus in the information providing apparatus; associating the content specifying data corresponding to the transmitted content with the keyword and information specifying a user of the terminal apparatus, and storing them in the management database as a content providing information in the information providing apparatus; associating the received content with the image in the terminal apparatus; and reproducing the associated content when the image is displayed on an image display section in the terminal apparatus.

According to an eighth aspect of the present invention, there is provided an information providing method used for an information providing system having terminal apparatuses connected to a network, and an information providing apparatus connected to the network and providing information including any one of at least sound, still image and video information to each terminal apparatus, comprising: storing several contents of the information and preview data of each content in a content database in the information providing apparatus; storing a keyword system composed of several keywords in a keyword database; in the information providing apparatus; transmitting user personal information of the terminal apparatus to the information providing apparatus in the terminal apparatus; storing the user personal information of the terminal apparatus and information providing history information to the user in the information providing apparatus; transmitting a content request command including content specifying information for specifying a content to the information providing apparatus in the terminal apparatus; receiving the content request command including the content specifying information, and transmitting a content specified by the content specifying information stored in the content database in the information providing apparatus; storing the received content in a content storage section in the terminal apparatus; selecting a content stored in the content storage section in the terminal apparatus; transmitting a keyword request command including a second content specifying information for specifying the selected content to the information providing apparatus in the terminal apparatus; receiving the keyword request command, and selecting at least one keyword stored in the keyword database based on the second content specifying information, the user personal information and the information providing history information, which are stored in the management database, in the information providing apparatus; transmitting the selected keyword to the terminal apparatus in the information providing apparatus; giving one keyword selected from keywords received from the information providing apparatus to the selected content in the terminal apparatus; transmitting a keyword information registration command including the given keyword and the second content specifying information to the information providing apparatus in the terminal apparatus; receiving the keyword information registration command from the terminal apparatus in the information providing apparatus; and associating information specifying a user of the terminal apparatus, content specifying data included in the keyword information registration command and the keyword, and storing them in the management database as keyword information in the information providing apparatus.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1A is a table showing category and keyword;
FIG. 1B is a table showing category and keyword;
FIG. 1C is a table showing category and keyword.

DETAILED DESCRIPTION OF THE INVENTION

Of content information such as sound, still image and video information, an explanation about sound information will be made in the following embodiments. However, the applied object of the present invention is not limited to the sound information.

FIRST EMBODIMENT

An information providing apparatus according to a first embodiment of the present invention specifies and provides sound information desired by user based on keywords. The foregoing operation is achieved using the following three functions.

(1) Keyword Suggest Function

According to the function, the information providing apparatus suggests a keyword list to user so that user selects the keyword. The keyword list provided to user is classified every category, and the category is associated with a keyword group. User selects a category shown in FIG. 1A, and thereafter, selects a keyword belonging to the category shown in FIG. 1B.

(2) Keyword Analysis Function

According to the function, the information providing apparatus analyzes an arbitrary keyword sent from user, and associates it with stored keywords.

(3) Sound Information Specifying Function

According to the function, the information providing apparatus takes a analysis procedure based on user personal information or history information. Then, the apparatus narrows down sound information according to user's hope from several sound information. Thereafter, the apparatus provides sound group samples associated with the keyword to user so that user selects sound information suitable to image feeling from these samples.

Figures 2, 5A, 5B:
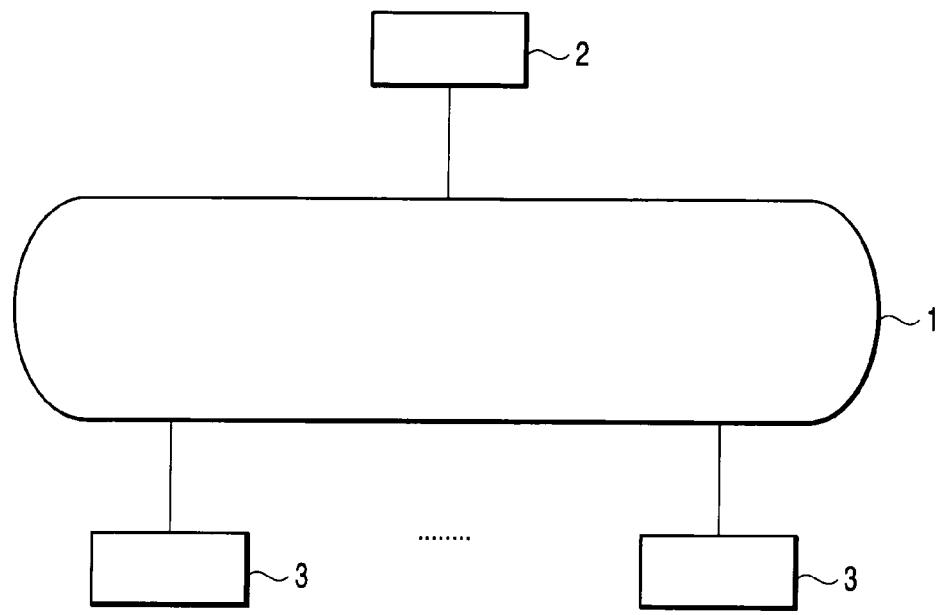
FIG. 2 is a block diagram showing the configuration of a network system connected with an information providing apparatus according to a first embodiment of the present invention.
FIG. 5A is a view to explain the configuration of a management database.
FIG. 5B is a view to explain the configuration of a management database.

FIG. 2 is a block diagram showing the configuration of a network system connected with the information providing apparatus according to the first embodiment of the present invention.

The network system is composed of information providing apparatus 2 and several user terminal apparatuses 3, which are connected to a communication line 1. The user terminal apparatuses 3 each receive sound information providing. The communication line 1 is a path widely used for information transmission and reception. In this case, there is no limitation to communication using wires conductive wire and optical fiber. Radio communications using photo, sound wave and electric wave are included.

Figure 3:
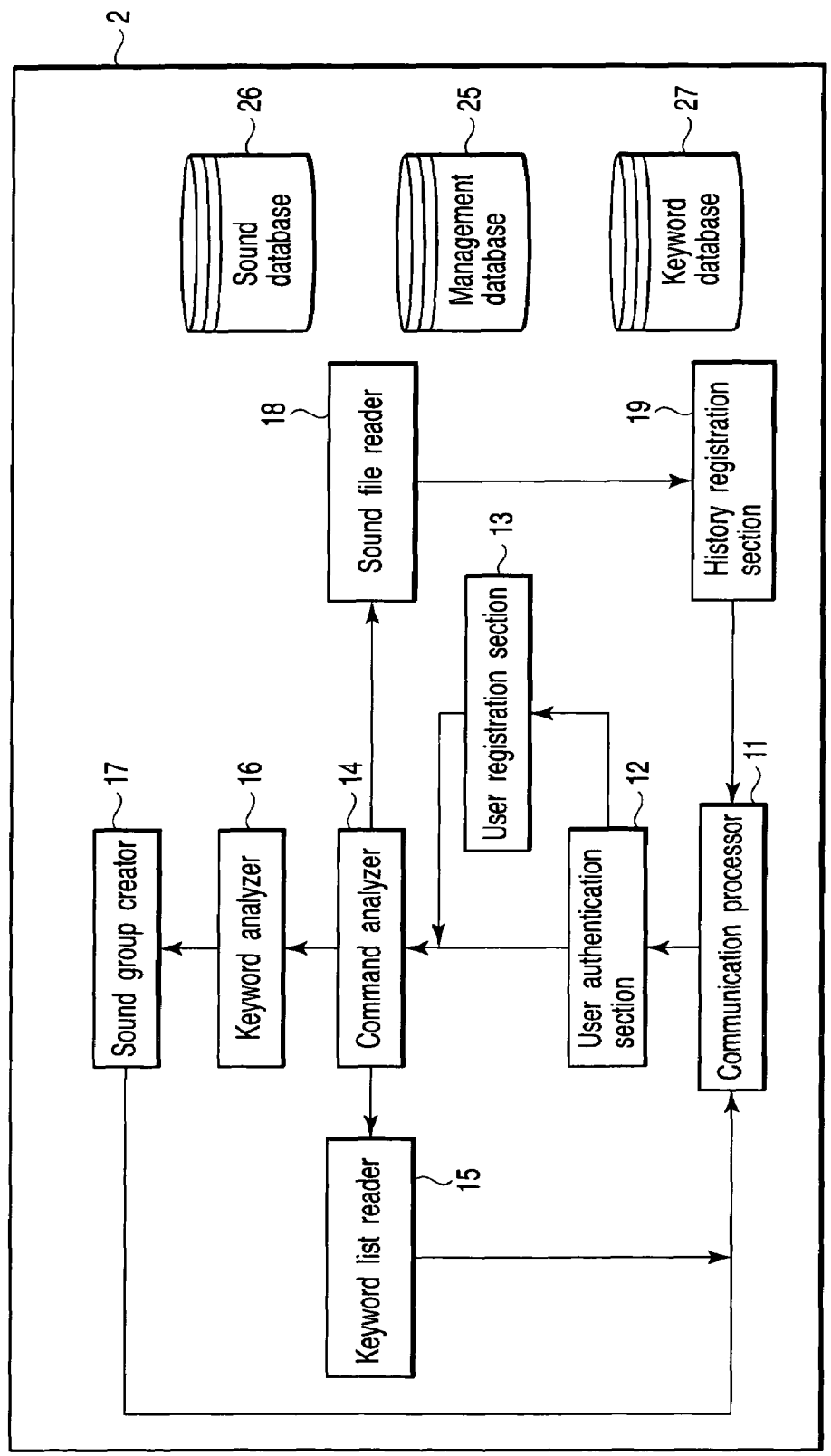
FIG. 3 is a block diagram showing the configuration of the information providing apparatus.

FIG. 3 is a block diagram showing the configuration of the information providing apparatus 2. The configuration and operation of the information providing apparatus 2 will be explained below with reference to FIG. 3.

A communication processor 11 is an interface for making an information exchange with the user terminal apparatus 3.

A user authentication section 12 authenticates whether or not communicating user makes user registration. If the communicating user makes no registration, a user registration section 13 newly makes user registration.

A command analyzer 14 boots necessary procedures in accordance with a request command from the user terminal apparatus 3. If the request command from the user terminal apparatus 3 is a keyword list request, a keyword list reader 15 reads the keyword list. Thereafter, the keyword list reader 15 sends it to the user terminal apparatus 3 via the communication processor 11.

If a keyword is sent from the user terminal apparatus 3, the keyword analyzer 16 makes analysis based on the sent keyword. A sound group creator 17 reads selected several sound information, and then, sends them to the user terminal apparatus 3 via the communication processor 11.

If the user terminal apparatus 3 directly designate specified sound information, a sound file reader 18 reads the designated sound information. A history registration section 19 registers information specifying user, keyword and designated sound information as history information. The history information is used for analysis made by the keyword analyzer 16.

The information providing apparatus 2 is further provided with management database 25, sound database 26 and keyword database 27. The management database 25 is stored with user personal information, in particular, information representing user characteristics. The management database 25 is further stored with the foregoing history information. The sound database 26 is stored with sound information. The keyword database 27 is stored with keyword and concept word having the concept identical to the keyword. The configuration of each database will be detailedly described later.

Figure 4:
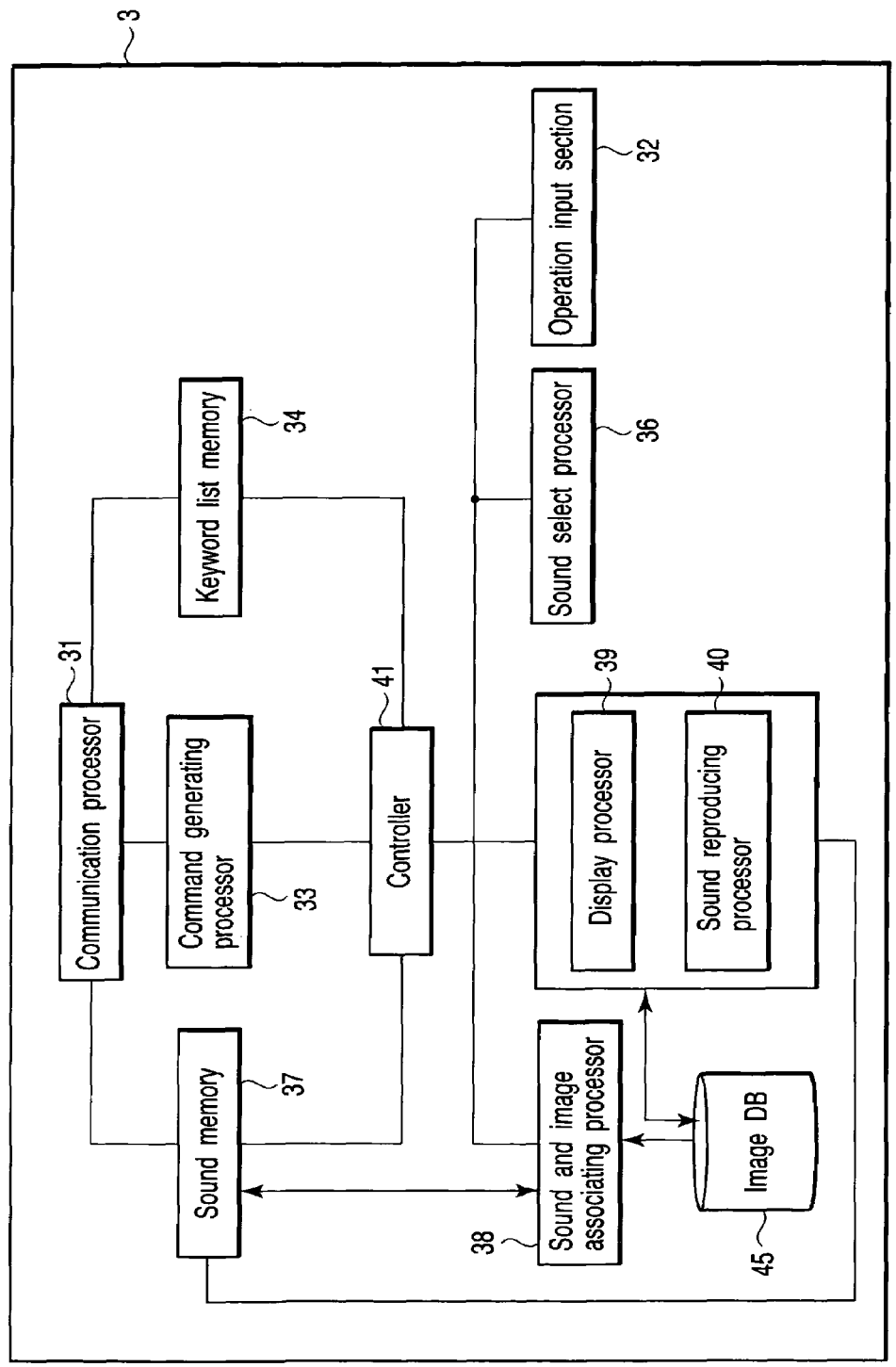
FIG. 4 is a block diagram showing the configuration of a user terminal apparatus.

FIG. 4 is a block diagram showing the configuration of the user terminal apparatus 3. The configuration and operation of the user terminal apparatus 3 will be explained below with reference to FIG. 4.

A communication processor 31 is an interface for making an information exchange with the information providing apparatus 2. An operation input section 32 is an input device such as mouse and keyboard for inputting instructions and data to the user terminal apparatus 3. The operation input section 32 is operated to make a keyword list request or sound request. In this case, a command generating processor 33 generates a request command, and then, transmits it to the information providing apparatus 2 via the communication processor 31.

A keyword list memory 34 stores the keyword list transmitted from the information providing apparatus 2. A sound select processor 36 selects sound from a sound group transmitted from the information providing apparatus 2. A sound memory 37 stores sound transmitted from the information providing apparatus 2. A sound and image associating processor 38 associates sound and image transmitted from the information providing apparatus 2. A display processor 39 displays images using slide show. A sound reproducing processor 40 reproduces the corresponding sound synchronous with image display. A controller 41 collectively controls the operation of the user terminal apparatus 3. An image DB 45 stores image data.

The configuration of the database included in the information providing apparatus 2 will be explained below.

FIG. 5A and FIG. 5B are each a view showing the configuration of the management database 25. The management database 25 is stored with user personal information shown in FIG. 5A and history information shown in FIG. 5B.

The user personal information is data generated when user makes registration. The user personal information includes information such as "name", "address" for specifying user. In addition, the user personal information includes information such as "birthday", "age" and "blood type" representing user's characteristics. The information representing user's characteristics is used for an analysis procedure described later.

The history information is information representing the history of sound transmitted to the user terminal apparatus 3 and keyword requested from there.

Figure 6:
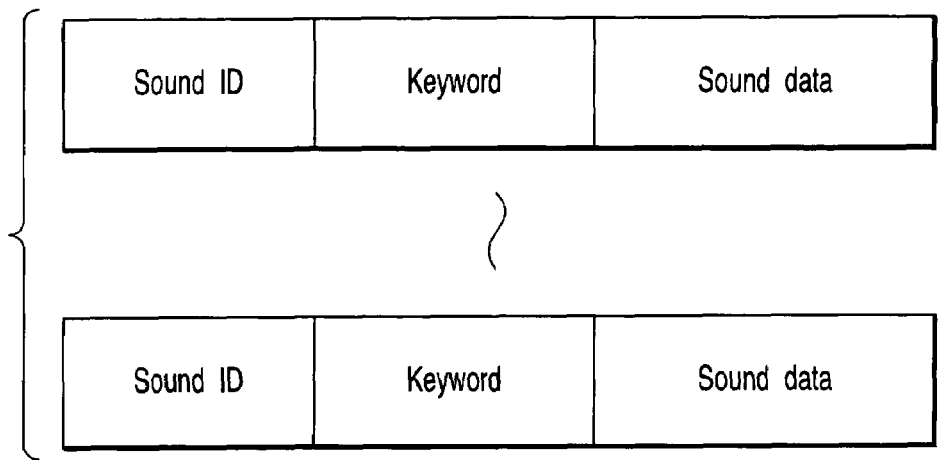
FIG. 6 is a view to explain the configuration of a sound database.

FIG. 6 is a view showing the configuration of the sound database 26. The sound database 26 is stored with sound data, "sound ID" specifying the sound data and one or several "keywords" associated with the sound data. The sound database 26 is further stored with preview data of the sound data, that is, sample data, in addition to the sound data.

Figure 7:
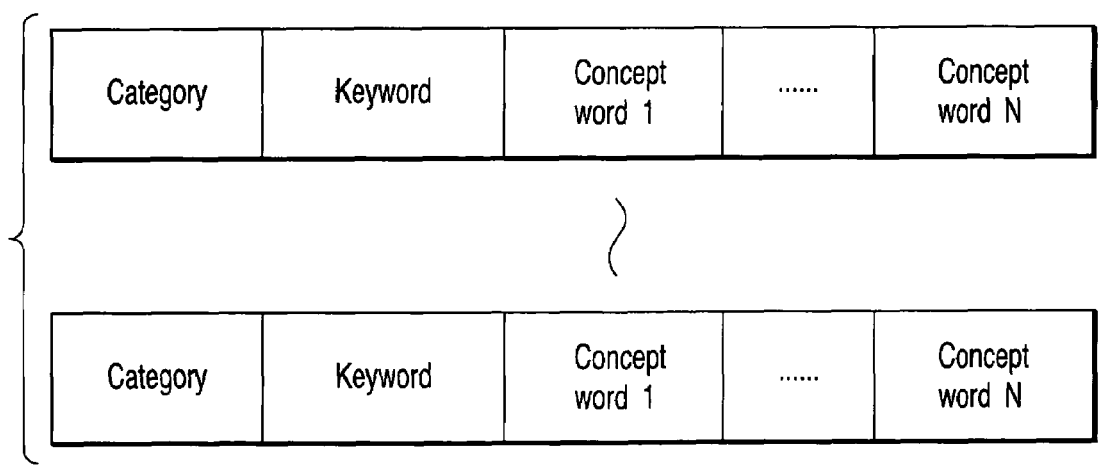
FIG. 7 is a view to explain the configuration of a keyword database.

FIG. 7 is a view showing the configuration of the keyword database 27. The keyword database 7 is stored with "category" used as a large classification, "keyword" used as a medium classification and several "concept words" having the concept identical to "the "keyword". Specifically, a word expressed by the "concept word" is replaced with the "keyword" in the information providing apparatus 2. In other words, the keyword database 27 is stored with the following words systematized together with the keyword. One is words, which are the broader concept of the keyword, and another is words representing the concept identical to the keyword.

The information providing procedure according to the present invention will be explained below.

Figure 8:
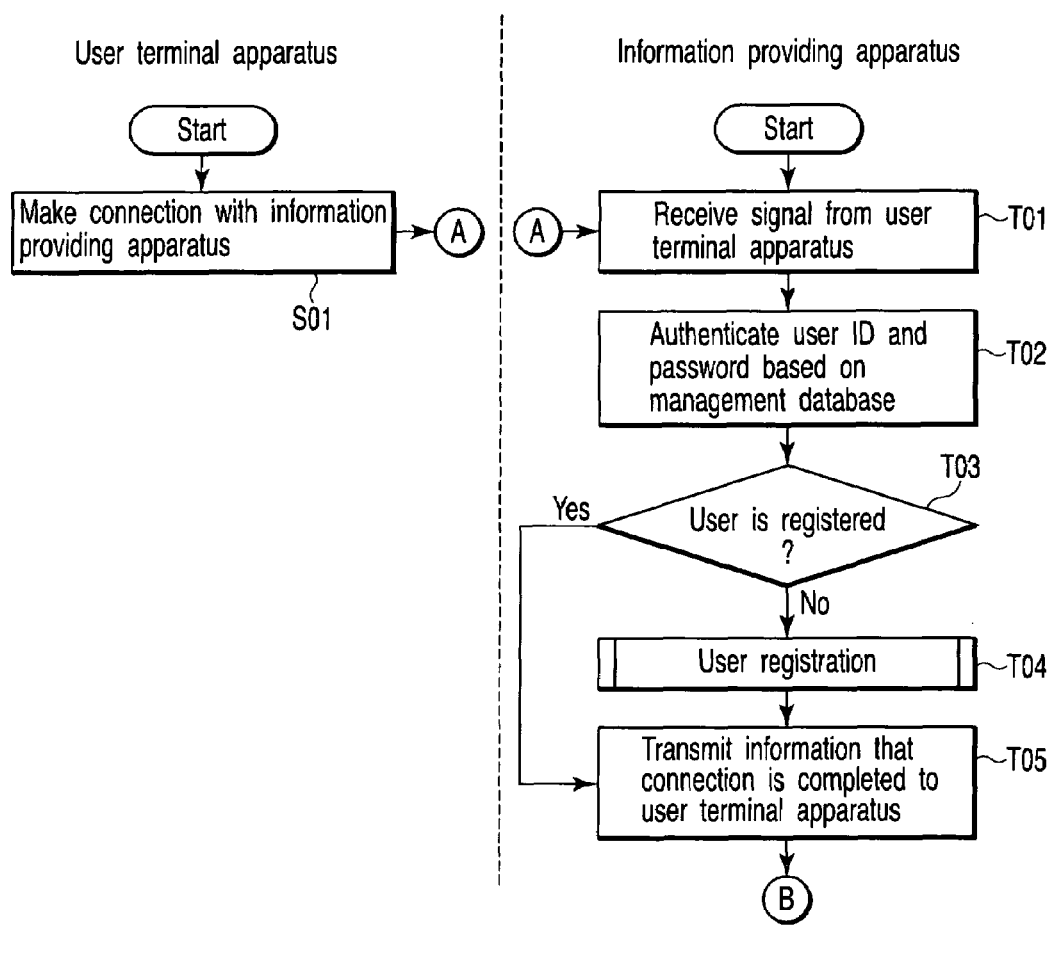
FIG. 8 is a flowchart to schematically explain the information providing procedure.

In step S01 of FIG. 8, the user terminal apparatus 3 makes a request of information providing with respect to the information providing apparatus 2 via the communication line 1. In steps T01 to T03, the user authentication section 12 searches the management database 25 based on user ID and password in the information providing apparatus 2. Then, the user authentication section 12 determines whether or not user registration is made.

If "YES" is given in step T03, that is, it is authenticated that user registration is made; information that connection is completed is transmitted to the user terminal apparatus 3 in step T05. On the other hand, if "NO" is given in step T03, that is, user registration is not made, the user registration section 13 executes the user registration procedure (see FIG. 10) in step T04.

Figure 10:
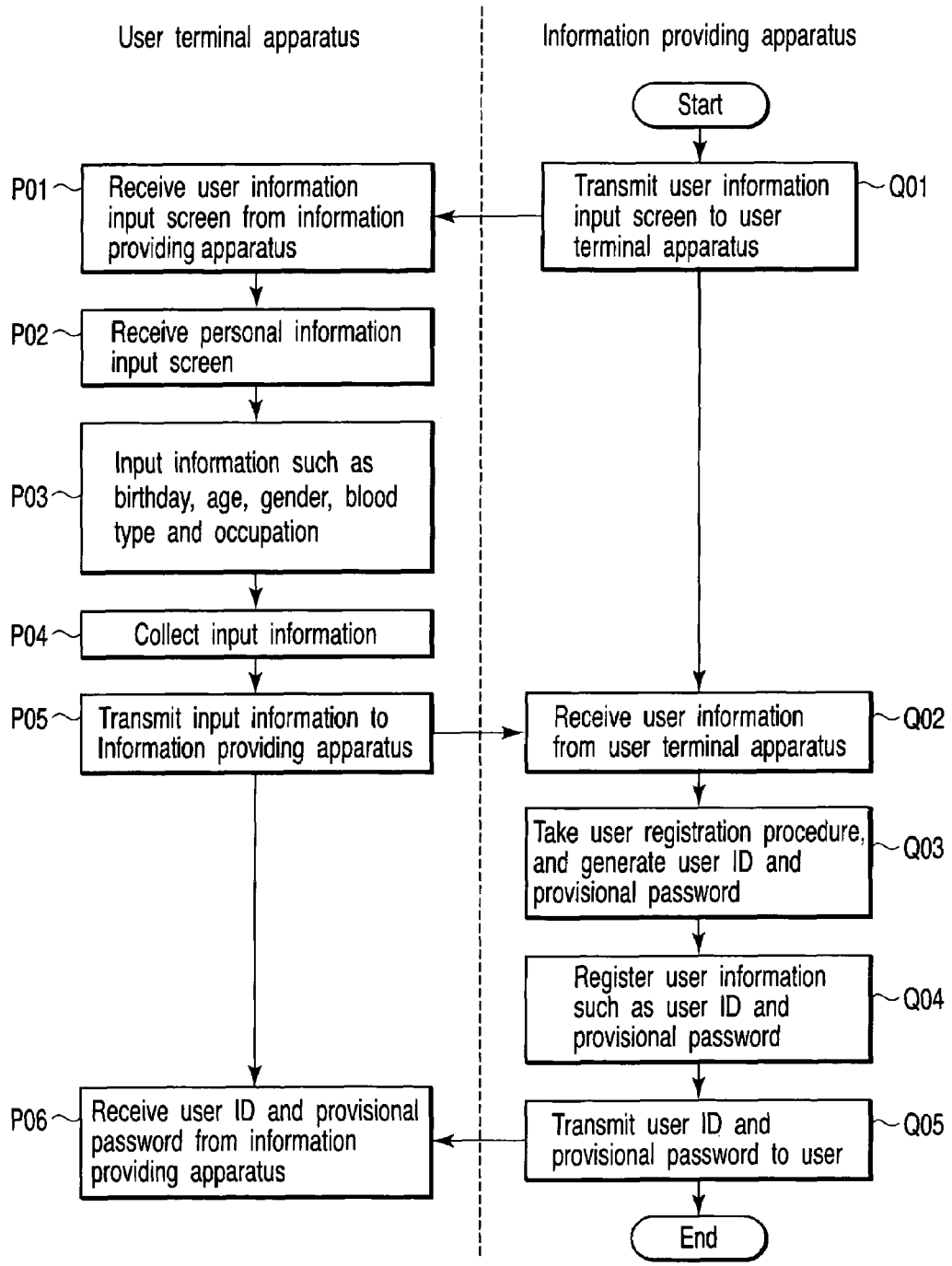
FIG. 10 is a flowchart to schematically explain the user registration procedure.

In step Q01 of FIG. 10, the user registration section 13 of the information providing apparatus 2 transmits a user information input screen to the user terminal apparatus 3.

In steps P01 and P02, the user terminal apparatus 3 displays the transmitted user information input screen on the display device (not shown) to input information. In step P03, user inputs information such as "birthday", "age" and "gender" using the operation input section 32 according to instructions of the input screen. In steps P04 and P05, the user terminal apparatus 3 collects the foregoing user information, and thereafter, transmits them to the information providing apparatus 2.

In this case, information inputted by user is used for specifying the person and information representing the personal characteristics as described above. Thus, the input information may include "hobby" and "personality" in addition to the foregoing described information.

In steps Q02 to Q05, the user registration section 13 of the information providing apparatus 2 registers transmitted information to the management database 25 while generates user ID and provisional password. In this case, the provisional password is usable for the term when user registration is formally authenticated later. Then, the user registration section 13 transmits user ID and provisional password to the user terminal apparatus 3.

In step P06, the user terminal apparatus 3 receives these user ID and provisional password. Thereafter, an information providing operation is possible between the information providing apparatus 2 and the user terminal apparatus 3.

Figure 9:
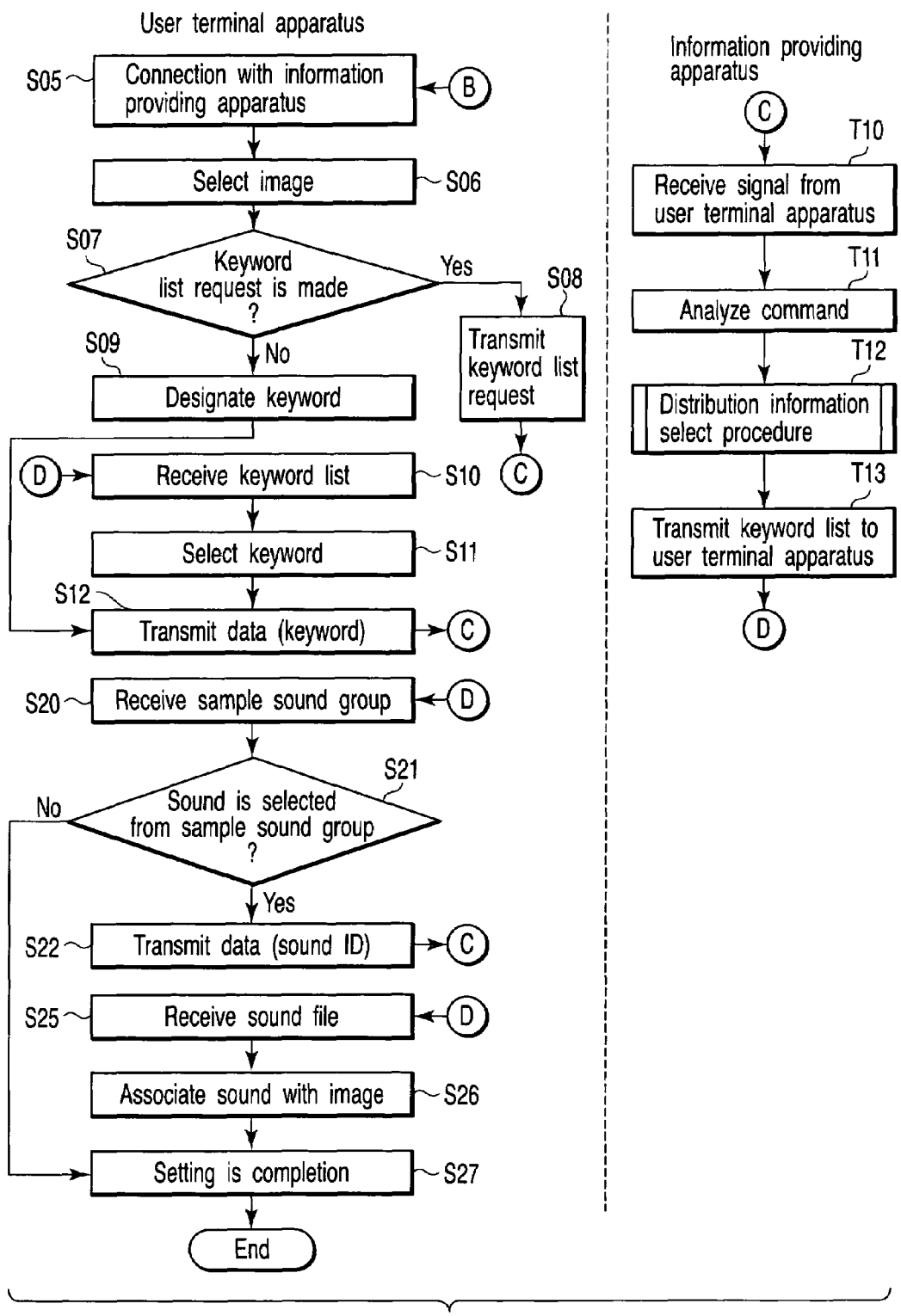
FIG. 9 is a flowchart to schematically explain the information providing procedure.

In step S05 of FIG. 9, the communication processor 31 confirms that communication with the information providing apparatus 2 is connected. In step S06, user selects an image, and then, operates to acquire a sound corresponding to the selected image. The following two methods of acquiring are given:

(1) Method of selecting a desired sound from the keyword list prepared in the information providing apparatus 2; and (2) Method of selecting a desired sound based on keyword designated by user.

If user employs the foregoing method (1), that is, request the keyword list, in step S08, the command generating processor 33 transmits a keyword list request command to the information providing apparatus 2.

In the information providing apparatus 2, the command analyzer 14 analyzes the received signal to specify the command in steps T10 and T11. Then, the command analyzer 14 executes a distribution information select procedure (see FIG. 11) shown in step T12.

Figure 11:
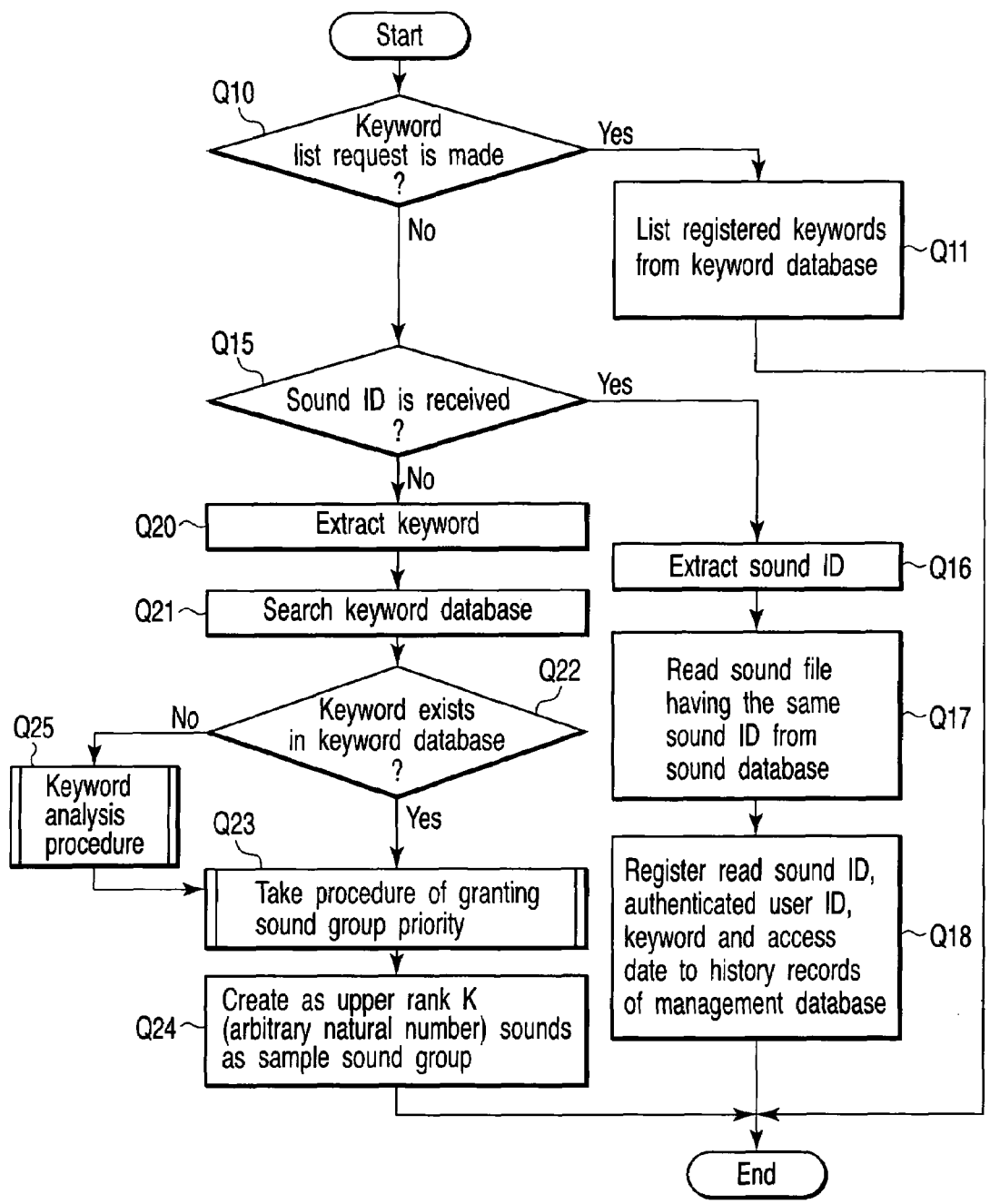
FIG. 11 is a flowchart to schematically explain the distribution information selecting procedure.

In step Q10 of FIG. 11, if the keyword list is requested, the keyword list reader 15 extracts a keyword stored in the keyword database 27 to create a list, and thereafter, returns.

Returning now to FIG. 9, in step T13, the communication processor 11 transmits the created keyword list to the user terminal apparatus 3.

In steps S10 and S11, the user terminal apparatus 3 displays the transmitted keyword list on the display device (not shown) so that user selects it. Incidentally, when user selects the keyword, the information providing apparatus 2 first transmits a category list, and thereafter, transmits the keyword list belonging to the category based on the category selected by user. According to the foregoing configuration, the transmission time is shortened. The user terminal apparatus 3 transmits a sample sound request command including the selected keyword to the information providing apparatus 2.

On the other hand, if user employs the foregoing method (2), that is, user designates the keyword in step S09, the user terminal apparatus 3 transmits preset keyword to information providing apparatus 2 in step S12.

The command analyzer 14 of the information providing apparatus 2 analyzes the received signal to specify the command in step T10 and T11, and executes a distribution information select procedure (see FIG. 11) shown in step T12.

In steps Q20 to Q22, the keyword analyzer 16 extracts a keyword from the transmitted command, and then, determines whether or not the keyword exists in the keyword database 27. If the keyword exists, the keyword analyzer 16 executes the procedure of granting sound group priority shown in step Q23 (see FIG. 12).

In step R01, the management database is searched to extract records having the same keyword from the history information. In this case, several history informations about many users exist in the management database 25. For this reason, many records including other user records are extracted with respect to one keyword in addition to records relevant to user itself. In step R02, a "sound ID" is read from these records, and thereafter, the number is totalized every "sound ID". In step R03, based on the totalized result, sound is ranked in the order of the number of "sound ID", that is, the number of times when specific keyword is given, most first.

In this case, user having characteristics close to the transmitted user characteristics is extracted, and thereafter, the foregoing priority may be granted with respect to the user. The following method is given to determine whether or not user characteristics are close to the transmitted user characteristics. According to the method, approximation is determined in user personal information record data between comparative user and transmitted user. For example, parameter data such as "birthday", "age" and "gender" is numerically expressed. Distance (Euclidean distance) between these several data may be calculated to determine the approximation.

The procedure of granting sound group priority is carried out, and thereafter, the flow returns to FIG. 11. In step Q24, the sound group creator 17 extracts K sounds from the upper rank to create preview sample sounds for these sounds and its list, and the flow returns.

Returning now to FIG. 9, in step T13, the communication processor 11 transmits K sample sound groups and its sound list to the user terminal apparatus 3.

In step S20, when the user terminal apparatus 3 receives the sample sound groups, the sound select processor 36 displays the received sound list on the display device (not shown) to support a user select operation. Specifically, when user selects one sound from the list, a sample sound of the selected sound is reproduced.

If "YES" is given in step S21, that is, user selects a specific sound from the sound list, a sound request command including sound ID of the sound is transmitted to the information providing apparatus 2.

In the information providing apparatus 2, the command analyzer 14 analyzes the received signal to specify the command in step T10 and T11. Then, the command analyzer 14 executes the distribution information select procedure (FIG. 11) shown in step T12.

In steps Q15 to Q17 of FIG. 11, the sound file reader 18 extracts the transmitted sound ID to search the sound database 26, and then, reads a sound file having the same sound ID. In step Q18, the history registration section 19 records new data to the history information of the management database. Namely, the section 19 adds read "sound ID", authenticated "user ID", "keyword" and "access data" to the history information, and thereafter, the flow returns.

Returning now to FIG. 9, in step T13, the communication processor 11 transmits the read sound file to the user terminal apparatus 3.

When receiving the sound file, in steps S25 and S26, the user terminal apparatus 3 stores the sound file in the sound memory 37. Simultaneously, the sound and image associating processor 38 associates sound and image. By doing so, sound data acquisition ends.

On the other hand, user employs the foregoing method (2), that is, user acquires a desired sound based on arbitrarily designated keyword in step S09. In this case, the command generating processor 33 transmits the keyword designated by user to the information providing apparatus 2 in step S12.

In the information providing apparatus 2, the command analyzer 14 analyzes the received signal to specify the command in steps T10 and T11, and executes the distribution information select procedure (FIG. 11) shown in step T12.

In steps Q20 to Q22 of FIG. 11, the keyword analyzer 16 extracts keyword from the command, and determines whether or not the keyword exists in the keyword database 27. If the keyword designated by user exists, the keyword analyzer 16 executes the procedure of granting sound group priority shown in step Q23 (see FIG. 12). The procedure has been already explained; therefore, the explanation is omitted.

On the other hand, if the keyword designated by user does not exist, the keyword analysis procedure (FIG. 13) shown in step Q25 is taken.

Figure 13:
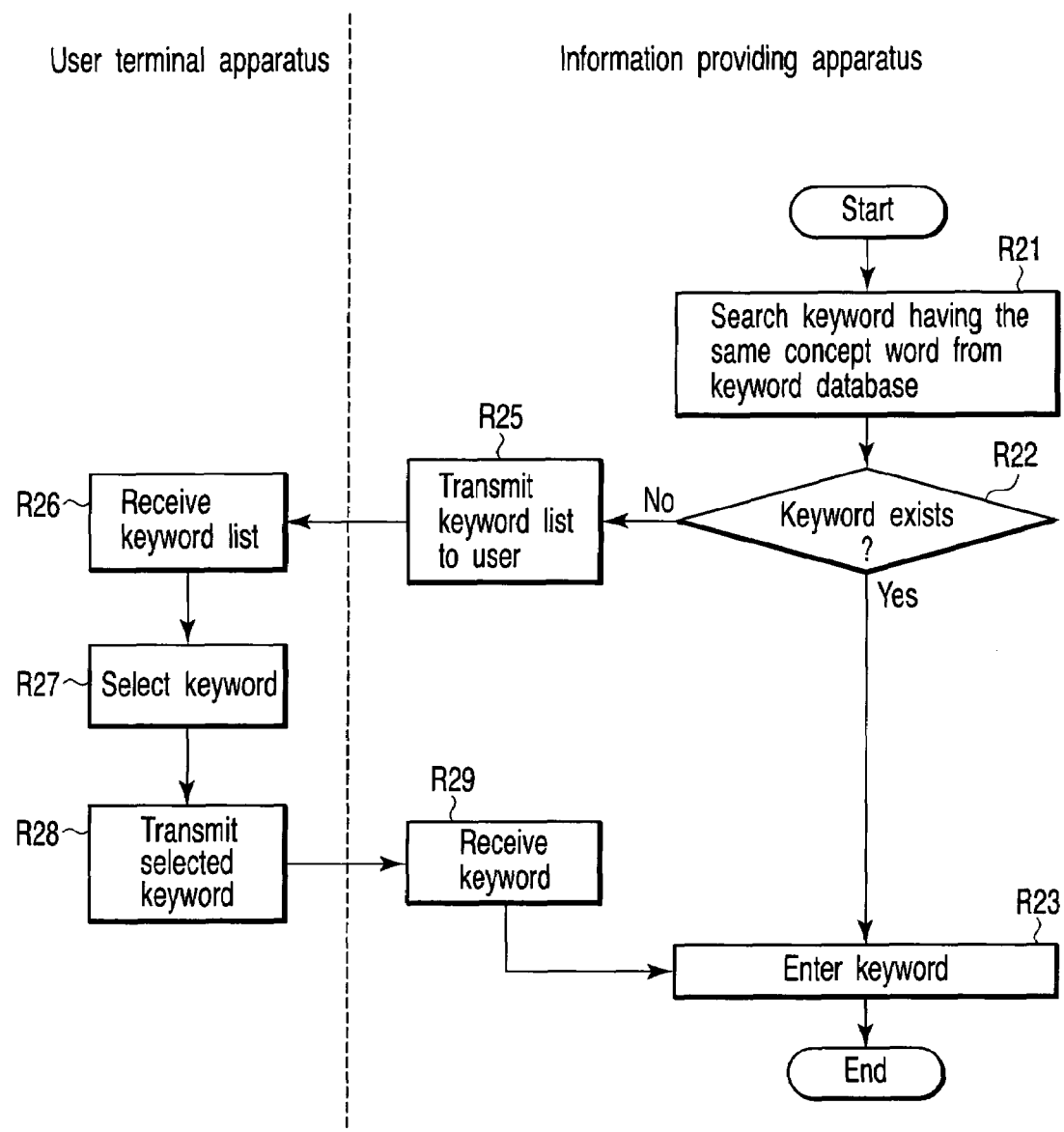
FIG. 13 is a flowchart to schematically explain the keyword analysis procedure.

In step R21 of FIG. 13, the keyword analyzer 16 of the information providing apparatus 2 searches the keyword database 27 to determine whether or not the same concept word as the keyword designated by user exists therein.

If "YES" is given in step R22, that is, the same concept word exists, a keyword equivalent to the concept word is extracted, and then, the extracted keyword is entered in step R23.

If "NO" is given in step R22, that is, the same concept word does not exist, the keyword list reader 15 transmits a keyword list to the user terminal apparatus 3.

In steps R26 and R27, the user terminal apparatus 3 displays the transmitted keyword list on the display device (not shown) to support a user select operation. In step R28, the user terminal apparatus 3 transmits the selected keyword to the information providing apparatus 3.

In the information providing apparatus 2, the keyword analyzer 16 extracts the transmitted keyword, and then, enters the extracted keyword in step R23.

Returning to FIG. 11, the procedures of steps Q23 and Q24 are taken based on the entered keyword. The procedure has been already explained; therefore, the detailed explanation is omitted.

SECOND EMBODIMENT

Figure 12:
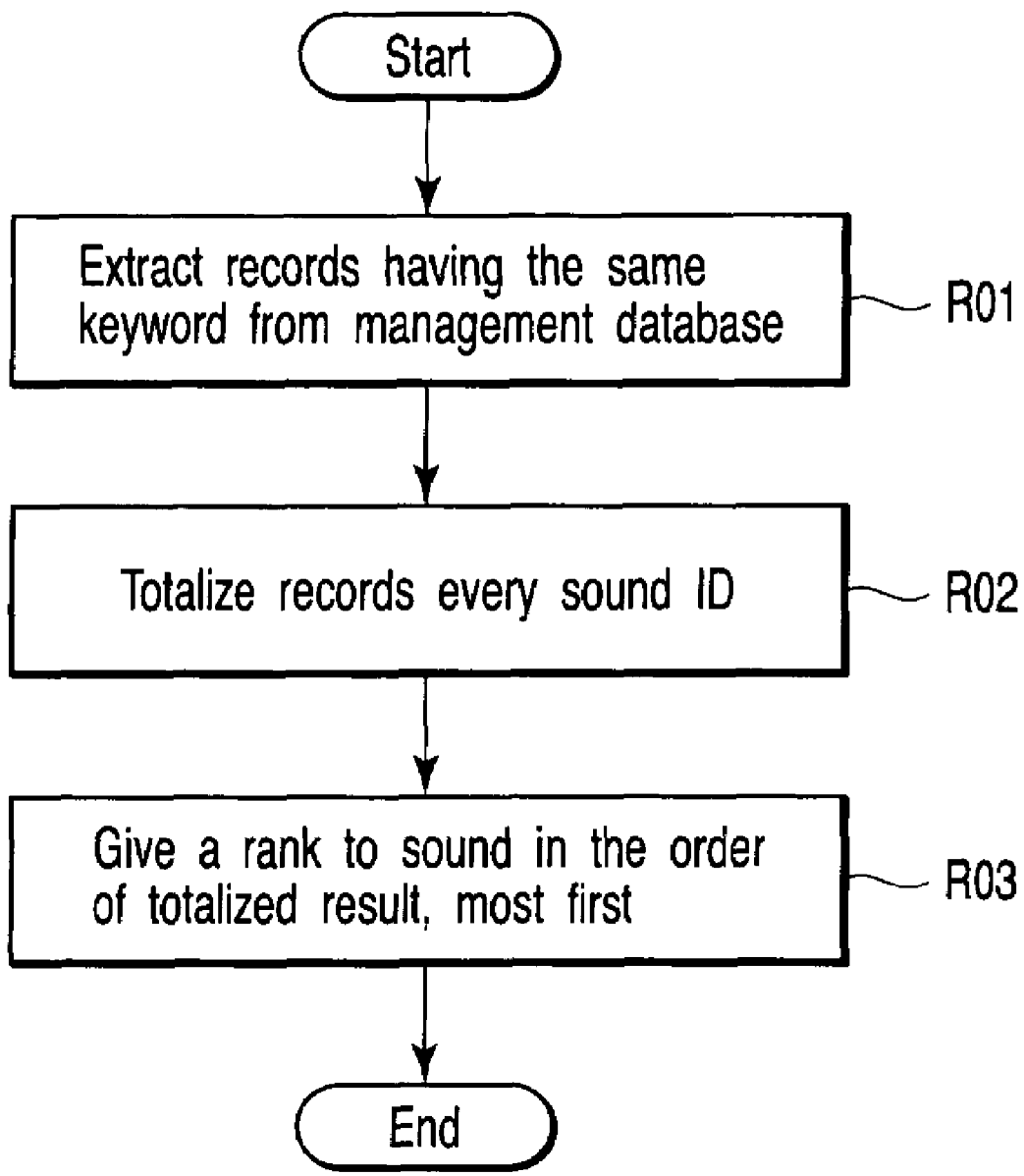
FIG. 12 is a flowchart to schematically explain the procedure of granting sound group priority.

An information providing apparatus according to the second embodiment of the present invention differs from that of the first embodiment in the procedure of granting sound group priority shown in FIG. 12. Therefore, the same reference numerals are used to designate elements identical to the first embodiment, and the detailed explanation is omitted.

Figure 14:
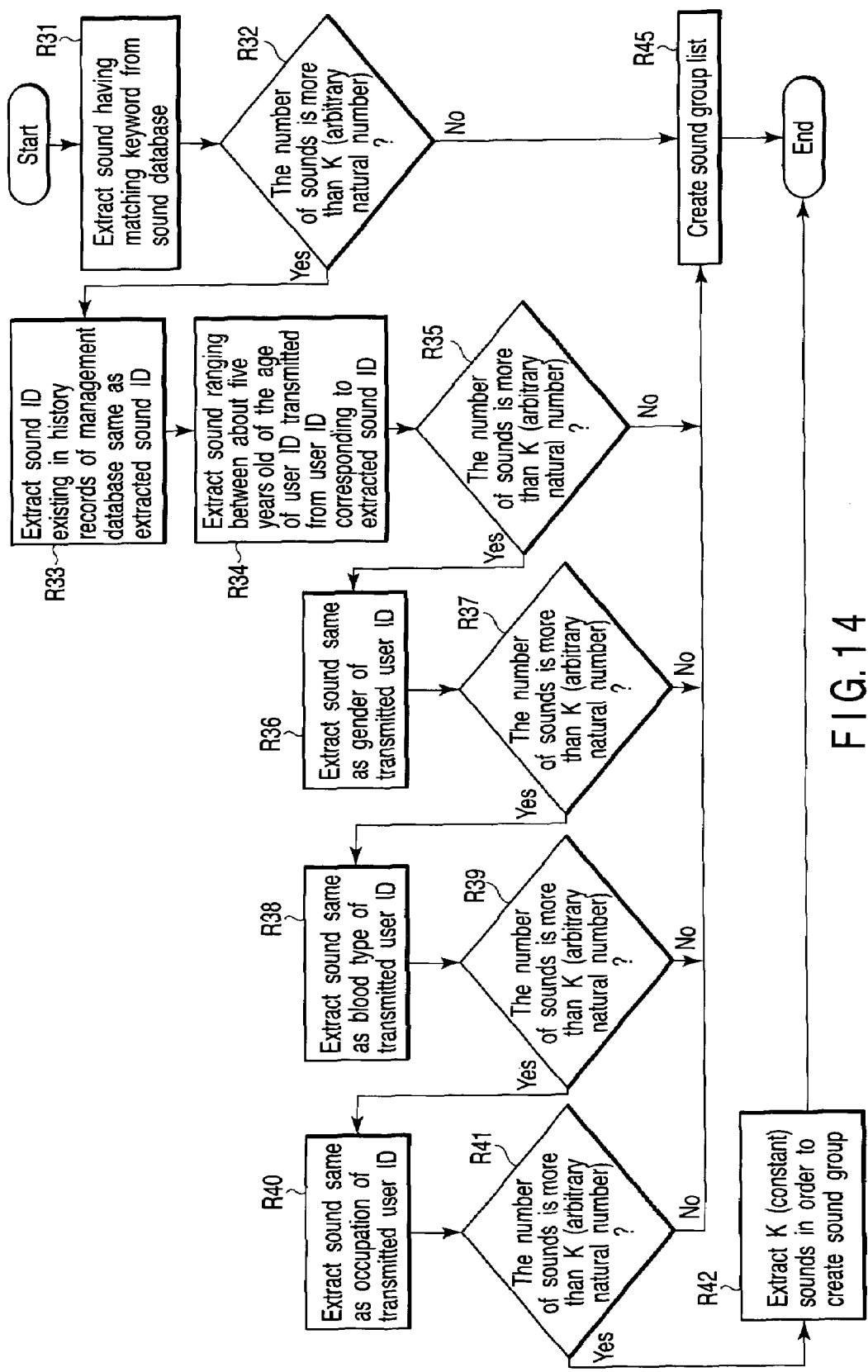
FIG. 14 is a flowchart to schematically explain the procedure of granting sound group priority according to a second embodiment of the present invention.

FIG. 14 is a flowchart to explain the procedure of granting sound group priority according to the second embodiment.

In step R31 of FIG. 14, the keyword analyzer 16 searches the sound database 26 to extract sound files having matching keyword. If "NO" is given in step R32, that is, the number of extracted sound files is less than K, the sound group creator 17 create sound file lists corresponding to the extracted number in step S45, and then, the flow returns. On the other hand, if "YES" is given in step R32, that is, the number of extracted sound files is more than K, the procedure of narrowing down the sound files to the number less than K is taken.

In step R33, history information of the management database 25 is searched to fetch history information having the same "sound ID" as the extracted sound ID. Then, personal information is searched with respect to "user ID" of the history information to extract personal information data.

In step R34, if the "age" of the extracted personal information ranges between about five years old of the age of user, who selects keyword, the sound file of the sound ID is employed as a select candidate file. However, if the "age" of the extracted personal information does not range between about five years old of the age of user, who selects keyword, the sound file of the sound ID is abandoned.

The foregoing procedure is carried out with respect to all of the extracted sound files. As a result, if "NO" is given in step R35, that is, if the number of employed sound files is less than K, the sound group creator 17 creates sound file lists corresponding to the extracted number, and the flow returns. On the other hand, if "YES" is given in step R35, that is, if the number of extracted sound files is more than K, the procedure of narrowing down the sound file to the number less than K is taken with respect to the next item.

In step R36, if the "gender" of the extracted personal information is the same as the gender of user, who selects keyword, the sound file of the sound ID is employed as a select candidate file. However, if the "gender" of the extracted personal information is different from of the gender of user, who selects keyword, the sound file of the sound ID is abandoned.

The foregoing procedure is carried out with respect to all of the sound files employed in step R34. As a result, if "NO" is given in step R37, that is, if the number of employed sound files is less than K, the sound group creator 17 creates sound file lists corresponding to the extracted number in step R45, and the flow returns. On the other hand, if "YES" is given in step R37, that is, the number of extracted sound files is more than K, the procedure of narrowing down the sound file to the number less than K is taken with respect to the next item.

In step R38, if the "blood type" of the extracted personal information is the same as the blood type of user, who selects keyword, the sound file of the sound ID is employed as a select candidate file. However, if the "blood type" of the extracted personal information is different from of the blood type of user, who selects keyword, the sound file of the sound ID is abandoned.

The foregoing procedure is carried out with respect to all of the sound files employed in step R36. As a result, if "NO" is given in step R39, that is, the number of employed sound files is less than K, the sound group creator 17 creates sound file lists corresponding to the extracted number in step R45, and the flow returns. On the other hand, if "YES" is given in step R39, that is, if the number of extracted sound files is more than K, the procedure of narrowing down the sound file to the number less than K is taken with respect to the next item.

In step R40, if the "occupation" of the extracted personal information is the same as of the occupation of user, who selects keyword, the sound file of the sound ID is employed as a select candidate file. However, if the "occupation" of the extracted personal information is different from the occupation of user, who selects keyword, the sound file of the sound ID is abandoned.

The foregoing procedure is carried out with respect to all of the extracted sound files. As a result, if "NO" is given in step R41, that is, if the number of employed sound files is less than K, the sound group creator 17 creates sample sounds of the extracted sound and its list in step R45, and the flow returns. On the other hand, if "YES" is given in step R41, that is, if the number of extracted sound files is more than K, in step R42, the sound group creator 17 extracts K sound files in the predetermined order. Then, the sound group creator 17 creates sample sounds of the extracted sound and its list, and then, the flow returns.

The procedures of FIG. 12 and FIG. 14 may be continuously carried out. Specifically, the procedure of FIG. 12 is first taken, and thereafter, of sounds granted with keyword designated by user, who requests sound, K1 sound having many grant number is extracted. The procedure of FIG. 14 is carried out with respect to the K1 sound to narrow down it to K2.

Moreover, the procedure of FIG. 14 is first carried out to extract another user having attribute close to user, who requests sound. Of sounds having the same keyword as keyword designated by user, who requests sound, sound having many grant number is extracted using only information providing history of another user.

THIRD EMBODIMENT

The third embodiment of the present invention relates to the operation when user gives a keyword to the acquired sound after the user terminal apparatus 3 already acquired sound from the information providing apparatus 2. The same operation as the first embodiment is given exclusive of the foregoing operation. For this reason, the same reference numerals are used to designate elements identical to the first embodiment; therefore, the detailed explanation is omitted.

Figure 15:
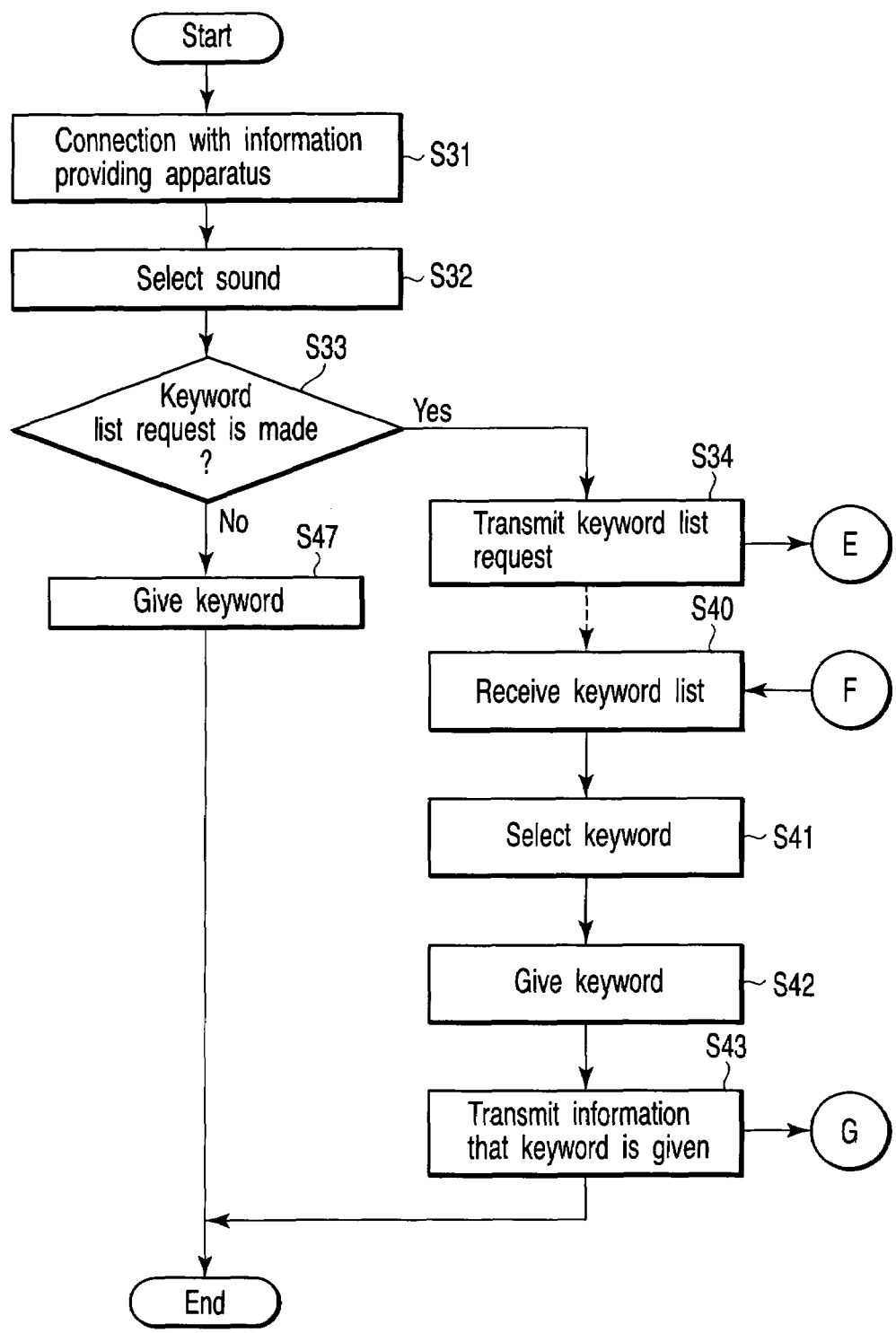
FIG. 15 is a flowchart to schematically explain the procedure of giving keyword.
Figure 16:
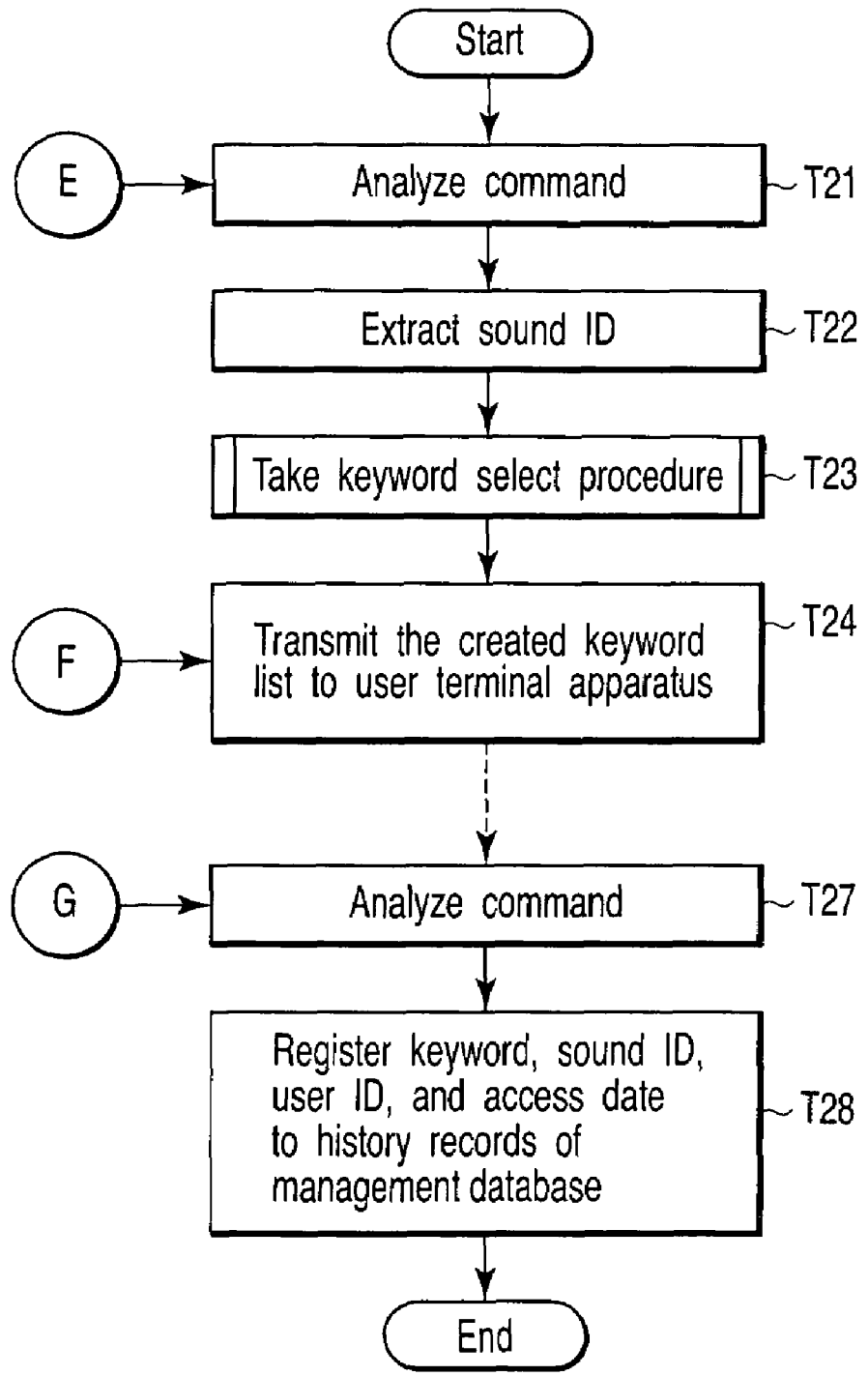
FIG. 16 is a flowchart to schematically explain the procedure of giving keyword.

FIG. 15 and FIG. 16 are each a flowchart to schematically explain the procedure of giving a keyword.

In step S31 of FIG. 15, the communication processor 31 confirms that communication with the information providing apparatus 2 is connected. In step S32, user selects a sound, and then, gives a keyword suitable to the selected sound. The following two methods are given to give the keyword:

(1) Method of selecting keyword based on the keyword list prepared in the information providing apparatus 2; and (2) Method that user arbitrarily creates keyword to given it to sound.

If user employs the foregoing method (1), that is, if a keyword list request is made, the command generation processor 33 transmits a keyword list request command to the information providing apparatus 2 in step S34. In this case, the transmitted keyword list request command includes "sound ID" for specifying the selected sound.

In the information providing apparatus 2, in steps T21 and T22, the command analyzer 14 analyzes the received command to extract sound ID, and then, executes the keyword select procedure (see FIG. 17) shown in step T23.

Figure 17:
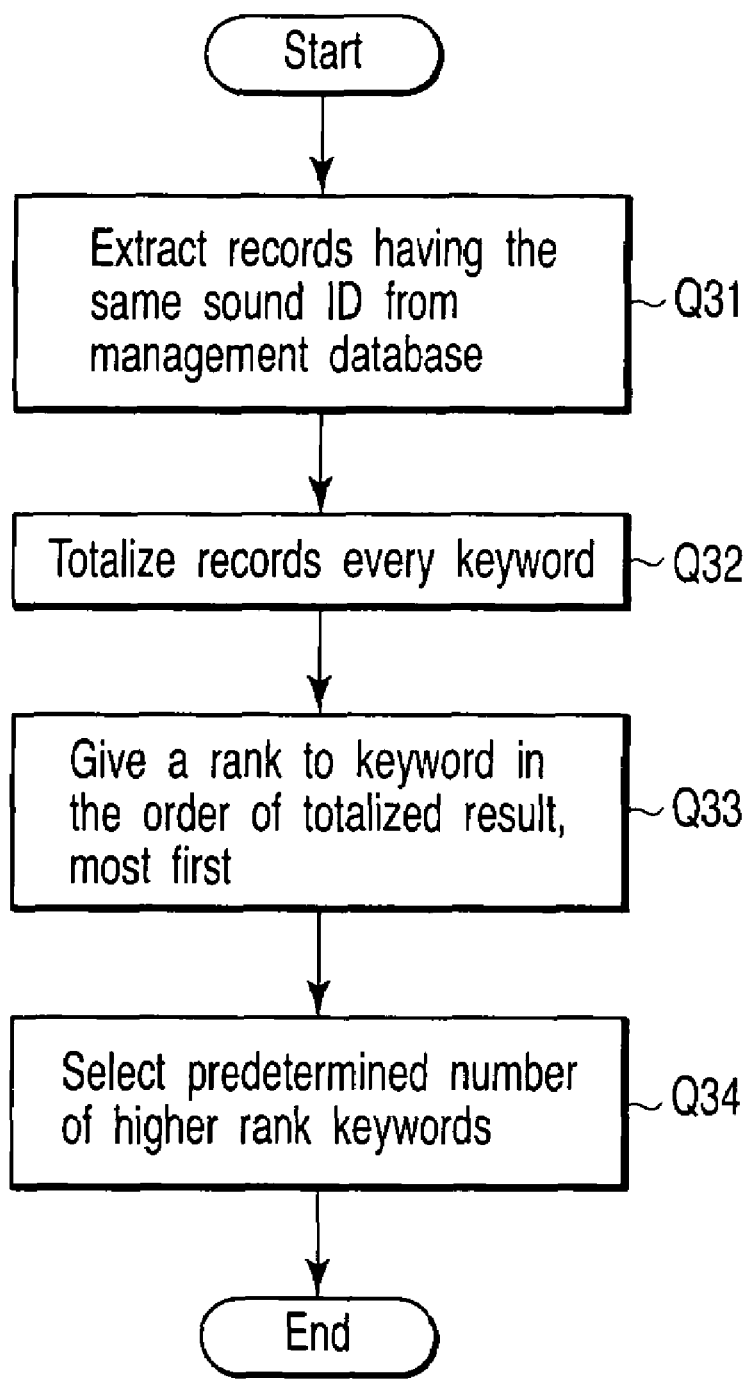
FIG. 17 is a flowchart to schematically explain the procedure of selecting keyword.

In step Q31 of FIG. 17, the management database 25 is searched to records having the same "sound ID" from history information. In this case, a great many of history information relevant to several users exist in the management database 25 as described before. For this reason, it is general that several records are extracted with respect to one "sound ID". In step Q32, a "keyword" is read from the records, and then, the number is totalized every "keyword". In step Q33, based on the totalized result, the keyword is ranked in the order of the totalized number, most first. In step Q34, the predetermined number of higher rank keywords is selected to create a keyword list.

Incidentally, the following method may be employed. According to the method, users having characteristics close to the transmitted user characteristics are extracted, and then, the foregoing ranking is given to theses users. In this case, the following method is given to determine whether or not user characteristics are close to the transmitted user characteristics. According to the method, approximation is determined in user personal information record data between comparative user and transmitted user. For example, parameter data such as "birthday", "age" and "gender" is numerically expressed. Distance (Euclidean distance) between these several data may be calculated to determine the approximation.

Returning now to FIG. 16, in step T24, the communication processor 11 transmits the created keyword list to the user terminal apparatus 3.

Returning again to FIG. 15, in step S40, the user terminal apparatus 3 displays the transmitted keyword list on the display device (not shown) so that user readily selects a keyword. If user selects the keyword, the information providing apparatus 2 transmits a category list. Then, based on the category selected by user, a keyword list belonging to the category may be transmitted. The foregoing configuration is given, and thereby, the transmission time is shortened.

The user terminal apparatus 3 gives the selected keyword to sound in steps S41 to S43. In other words, the keyword is stored associating with sound. Information that keyword is given is transmitted to the information providing apparatus 2, and then, the flow ends. The transmitted information includes data such as used keyword and sound ID.

In steps T27 and T28 of FIG. 16, the information providing apparatus 2 analyzes the transmitted command. Thereafter, the information providing apparatus 2 stores data such as user ID and access date in the history record of the management database 25 together with the extracted keyword and sound ID, and then, the flow ends Returning now to FIG. 15, if user employs the foregoing method (2), that is, if user designates a keyword in step S33, the user terminal apparatus 3 gives setting keyword to sound in step S47. In other words, the user terminal apparatus 3 stores the keyword associating with sound, and then, the flow ends.

Incidentally, the information providing apparatus 2 provides the keyword list used when user gives keyword to contents to the user terminal apparatus 3. The keyword list may be all or part of the keyword system same as the keyword system used for searching contents. Moreover, the keyword list may be all or part of the keyword system quite different from the keyword system used for searching contents.

According to the foregoing embodiments, the keyword system included in the information providing apparatus is used. Therefore, it is possible to eliminate labor spent when user builds up the keyword system. In addition, keyword given to the same content by many other users is analyzed, and frequently given keyword is suggested. Therefore, it is possible to obtain a high possibility that keyword suitable to the content is suggested.

The functions described in the foregoing embodiments may be configured using hardware. Moreover, a computer may read programs describing the functions using software. The functions may be properly configured using either of software or hardware.

The computer reads programs stored in a recoding medium, and thereby, the foregoing functions are realized. The recording medium of the embodiments may be any other recoding form so long as it is capable of recording programs and readable by a computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information providing system having terminal apparatuses connected to a network, and an information providing apparatus connected to the network and providing information including sound, still image, or video contents to the terminal apparatus, the information providing apparatus comprising:

a communication section configured to communicate with each terminal apparatus via the network;

a content database configured to store the contents and preview data of each of the contents;

a keyword database configured to store a predetermined keyword group composed of keywords given to each content for selection;

a command analysis section configured to specify a command from one of the terminal apparatuses received by the communication section;

a user specifying section configured to specify a user transmitting the command;

a keyword group providing section configured to transmit at least a part of the keyword group stored in the keyword database to the terminal apparatus via the communication section when a command specified by the command analysis section is a keyword request command;

a management database configured to store personal information of users of the terminal apparatuses and an information providing history which is data indicative of contents that the information providing apparatus has previously transmitted to the terminal apparatuses;

a content preview select section configured to specify at least one content from the contents stored in the content database based on the keyword, the personal information and the information providing history stored in the management database when a command specified by the command analysis section is a content preview request command including a keyword of the keyword group, and select the preview data of the specified content and content specifying data for specifying the content;

a content preview providing section configured to transmit the content preview data and the content specifying data selected by the content preview select section to the terminal apparatus;

a content providing section configured to transmit a content stored in the content database specified by the content specifying data to the one of the terminal apparatuses when a command specified by the command analysis section is a content request command including the content specifying data;

the terminal apparatuses comprising:

a second communication section configured to communicate with the information providing apparatus via the network;

an image storage section configured to store at least one image;

an image select section configured to select an image stored in the image storage section;

a keyword group request section to transmit a keyword group request command to the information providing apparatus via the second communication section;

a keyword select section configured to select a keyword from a keyword group received via the second communication section;

a content preview request section configured to transmit a content preview request command including the selected keyword to the information providing apparatus;

a content select section configured to select a content from several content preview data received via the second communication section;

a content request section configured to transmit a content request command including a content specifying information for specifying the selected content;

an associating section configured to associate a content received in accordance with the content request command via the second communication section with an image selected in the image select section;

a content reproducing section configured to reproduce the content associated by the associating section when the image selected by the image select section is displayed on an image display section; and a personal information providing section transmitting user personal information of the terminal apparatus to the information providing apparatus via the second communication section.

2. The system according to claim 1 wherein the content preview select section of the information providing apparatus includes:

a content sort section configured to give a rank to several contents to which the keyword is given based on the content providing information stored in the management database by the information providing history registration section;

and a higher-rank content select section configured to select a predetermined number of the contents in an order of the contents ranked by a content sort section, highest first.

3. An information providing method used for an information providing system having terminal apparatuses connected to a network, and an information providing apparatus connected to the network and providing sound, still image, or video contents to the terminal apparatuses, comprising:

storing the contents and preview data of each of the contents in a content database in the information providing apparatus;

storing a keyword group composed of keywords given to each of the contents for selection in a keyword database in the information providing apparatus;

transmitting, with the one of the terminal apparatuses, user personal information of one of the terminal apparatuses to the information providing apparatus;

storing the user personal information of the terminal apparatus in a managing database in the information providing apparatus;

selecting, with the one of the terminal apparatuses, an image stored in the image storage section;

transmitting, with the one of the terminal apparatuses, a keyword group request command to the information providing apparatus;

receiving, by the information providing apparatus, the keyword group request command from the one of the terminal apparatuses;

transmitting, by the information providing apparatus, at least a part of the keyword group stored in the keyword database to the terminal apparatus as a second keyword group in the information providing apparatus;

storing keyword providing information which includes at least keyword specifying data of the second keyword group and a user specifying data as an information providing history in the managing database;

selecting, with the terminal apparatus, a keyword from the received second keyword group, and transmitting a content preview request command including the selected keyword to the information providing apparatus;

receiving by the information providing apparatus, the content preview request command including the selected keyword;

specifying by the information providing apparatus, at least one content from several contents stor6d in the content database based on the keyword, the user personal information and the information providing history stored in the management database, and selecting the preview data of the specified content and content specifying data for specifying the content;

transmitting by the information providing apparatus, the content preview data and the content specifying data to the terminal apparatus;

selecting, with the one of the terminal apparatuses, a content from the received content preview data, and transmitting a content request command including content specifying information for specifying the selected content;

receiving, by the information providing apparatus, the content request command including the content specifying data;

transmitting, by the information providing apparatus, a content specified by the content specifying data stored in the content database to the terminal apparatus storing content providing information including at least the contents specifying data and user specifying data as the information providing history in the managing database;

associating, by the information providing apparatus, the content specifying data corresponding to the transmitted content with the keyword and information specifying a user of the one of the terminal apparatuses, and storing them in the management database as a content providing information;

associating the received content with the image by the one of the terminal apparatuses; and reproducing the associated content when the image is displayed on an image display section in the one of the terminal apparatuses.

4. The method according to claim 3 wherein when selecting the content preview, the information providing apparatus gives a rank to several contents to which the keyword is given based on the content providing information stored in the management database, and selects a predetermined number of contents in the order of the contents ranked by a content sort section, highest first.

* * * * *